US012617105B2

(12) United States Patent
Solomon et al.

(10) Patent No.: US 12,617,105 B2
(45) Date of Patent: May 5, 2026

(54) ROBOTIC END EFFECTOR SYSTEM AND METHOD WITH LOCKABLE COMPLIANCE

(71) Applicants: GM GLOBAL TECHNOLOGY OPERATIONS LLC, Detroit, MI (US); Northwestern University, Evanston, IL (US)

(72) Inventors: Joshua Lee Solomon, Berkley, MI (US); Hui-ping Wang, Troy, MI (US); Lu Huang, Troy, MI (US); Dalong Gao, Rochester, MI (US); Dohyun Leem, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 959 days.

(21) Appl. No.: 17/810,723

(22) Filed: Jul. 5, 2022

(65) Prior Publication Data

US 2024/0009864 A1 Jan. 11, 2024

(51) Int. Cl.
| | |
|---|---|
| *B25J 15/08* | (2006.01) |
| *B25J 11/00* | (2006.01) |
| *B25J 13/08* | (2006.01) |
| *B25J 15/06* | (2006.01) |
| *B25J 17/00* | (2006.01) |

(52) U.S. Cl.
CPC ........... *B25J 15/083* (2013.01); *B25J 11/005* (2013.01); *B25J 13/085* (2013.01); *B25J 15/0616* (2013.01); *B25J 17/00* (2013.01)

(58) Field of Classification Search
CPC .. B25J 15/083; B25J 15/0616; B25J 15/0061; B25J 15/12; B25J 11/005; B25J 13/085; B25J 17/00; B25J 17/0275; B25J 9/1612; B25J 9/14; B25J 9/1682; B25J 18/00
See application file for complete search history.

(56) References Cited

U.S. PATENT DOCUMENTS

| | | | | |
|---|---|---|---|---|
| 4,848,179 | A | 7/1989 | Ubhayakar | |
| 7,421,886 | B1 * | 9/2008 | Fox | B25J 19/0095 73/40.7 |
| 8,108,978 | B2 * | 2/2012 | Van Zile, III | B25J 15/0061 29/559 |
| 8,857,877 | B2 * | 10/2014 | Lin | B25J 15/0052 901/14 |

(Continued)

FOREIGN PATENT DOCUMENTS

| | | |
|---|---|---|
| DE | 69529603 T2 | 6/2003 |
| DE | 202010005313 U1 | 10/2011 |

(Continued)

*Primary Examiner* — Stephen A Vu
(74) *Attorney, Agent, or Firm* — Ingrassia Fisher & Lorenz, LLP | IF&L

(57) ABSTRACT

Robotic systems and methods are provided with an end effector having lockable compliance. A robotic system for manipulating a workpiece includes an arm having a pair of sections connected by a joint assembly, with a lock disposed in the joint assembly. A gripper is connected on the arm and is configured to alternately grip and release the workpiece. A controller operates the lock to alternately lock and unlock the joint assembly. The gripper holds the workpiece during a deformation of the workpiece, while the controller may unlock the lock to allow movement of the joint assembly to relieve forces on the arm arising during a deformation of the workpiece.

20 Claims, 8 Drawing Sheets

(56) References Cited

U.S. PATENT DOCUMENTS

2009/0035107 A1* 2/2009 Duran .................. B60B 29/002
                                            901/41
2009/0194922 A1* 8/2009 Lin ..................... B25J 15/0052
                                            901/41
2016/0339590 A1* 11/2016 Lin ..................... B25J 15/0408
2022/0219701 A1    7/2022 Chikamori et al.

FOREIGN PATENT DOCUMENTS

DE    102013202571 B4    5/2016
DE    102019116056 A1    6/2020
DE    102022134050 A1    6/2023
EP        3774198 B1     1/2022
WO       2007145566 A1  12/2007

* cited by examiner

ROBOTIC END EFFECTOR SYSTEM AND METHOD WITH LOCKABLE COMPLIANCE

INTRODUCTION

The present disclosure generally relates to automated forming and assembly, and more particularly relates to robotic systems and methods with an end effector that includes lockable arms with selectable compliance to allow deformation of the gripped item.

Carrying out certain forming and assembly operations efficiently is challenging. For components such as sheet metal panels, forming may be carried out by costly geometric-specific tools such as dies mounted in presses with complex transfer tooling for moving parts between operations. Where high-volume production runs of panels are required, stamping presses and dies that have relatively high costs and long development lead-time may be used. When low production volumes are involved, such operations may be cost-prohibitive.

Robots have come into widespread use, including applications in assembly operations that are difficult to accomplish manually. Vehicle assembly plants have used robots for spot welding and painting. These applications use relatively simple end effectors such as paint sprayers and spot welders. Each manufacturing application may use its own type of end effector. Using robotic systems and end effectors for forming operations is challenging because the item being formed is gripped and then released by the robot as its dimensions are changed during forming. This requires repeatedly engaging the item with some form of gripper.

Accordingly, it is desirable to provide robotic systems and methods that efficiently, accurately and repeatably carry out forming and/or assembly operations that involve dimensional changes in the item being handled. In addition, the flexibility to apply the systems to a wide variety of operations is desirable. Furthermore, other desirable features and characteristics of the present invention will become apparent from the subsequent detailed description and the appended claims, taken in conjunction with the accompanying drawings and the foregoing technical field and background.

SUMMARY

Robotic systems and methods are provided with an end effector having lockable compliance. A robotic system for manipulating a workpiece includes an arm having a pair of sections connected by a joint assembly, with a lock disposed in the joint assembly. A gripper is connected on the arm and is configured to alternately grip and release the workpiece. A controller operates the lock to alternately lock and unlock the joint assembly. The gripper holds the workpiece during a deformation of the workpiece, while the controller may unlock the lock to allow movement of the joint assembly to relieve forces on the arm arising during a deformation of the workpiece.

In additional embodiments, the joint assembly includes a force sensor configured to provide a force signal to the controller, wherein the controller is configured to unlock the joint when the force signal exceeds a threshold force.

In additional embodiments, the controller is configured to unlock the lock while the gripper holds the workpiece.

In additional embodiments, a vision system is configured to provide a signal to the controller indicative of deformation of the workpiece, wherein the controller is configured to unlock the joint when the signal indicates exceeding a threshold deformation.

In additional embodiments, the first section comprises an elongated body with a first end, a second end, and a side extending from the first end to the second end. The first end is connected with the joint assembly, wherein the gripper is connected at the side of the body.

In additional embodiments, the arm is a first arm and comprising a second arm that includes a second lock configured to alternately lock and unlock the second arm. The second arm includes a second gripper configured to alternately grip and release the workpiece. The controller is configured to alternately lock and unlock the second lock.

In additional embodiments, the joint assembly includes a force sensor configured to provide a force signal to the controller. The controller: records a baseline force on the arm based on the force signal received prior to the deformation of the workpiece; receives a measured force from the force sensor after initiation of the deformation; compares the measured force to a threshold force; and unlocks the joint when the measured force exceeds the threshold force.

In additional embodiments, the gripper comprises a suction cup. A pneumatic system is coupled with the suction cup and with the controller. The controller is configured to control the pneumatic system to maintain connection between the suction cup and the workpiece during the deformation.

In additional embodiments, the joint assembly includes a ball and socket joint, wherein the lock includes a band encircling the ball and configured, in response to the controller, to squeeze the ball to lock the joint.

In additional embodiments, the gripper is a first gripper disposed on the first section. A second gripper is disposed on the second section. The first gripper and the second gripper are configured to simultaneously grip the workpiece.

In a number of other embodiments, a method for manipulating a workpiece includes constructing an arm to have a first section and a second section connected with the first section by a joint assembly. A lock is disposed in the joint assembly and a gripper is connected with the arm. The workpiece is alternately gripped and released by the gripper. A controller operates the lock to alternately lock and unlock the joint. The gripper holds the workpiece during a deformation of the workpiece, while the joint is unlocked by the controller to allow movement of the joint assembly relieving, by the unlocking, forces on the arm arising during a deformation of the workpiece.

In additional embodiments, a force sensor at the joint assembly the joint assembly provides a force signal to the controller. The controller unlocks the joint when the force signal exceeds a threshold force.

In additional embodiments, the controller unlocks the lock while the gripper holds the workpiece.

In additional embodiments, a vision system provides a signal to the controller indicative of deformation of the workpiece. The controller unlocks the joint when the signal exceeds a threshold deformation.

In additional embodiments, the first section is formed with an elongated body having a first end, a second end, and a side extending from the first end to the second end. The first end is connected with the joint assembly and the gripper is connected at the side of the body.

In additional embodiments, a second arm includes a second lock is configured to alternately lock and unlock the second arm. A second gripper is configured to alternately grip and release the workpiece. The controller alternately locks and unlocks the second lock.

In additional embodiments, a force sensor is disposed at the joint assembly providing a force signal to the controller.

The controller records, prior to the deformation of the workpiece, a baseline force on the arm as received from the force sensor. The controller receives from the force sensor, a measured force after initiation of the deformation. The controller compares the measured force to a threshold force. The controller unlocks the joint when the measured force exceeds the threshold force.

In additional embodiments, the gripper is a suction cup. A pneumatic system is coupled with the suction cup and with the controller. The controller controls the pneumatic system to maintain connection between the suction cup and the workpiece during the deformation.

In additional embodiments, the gripper is connected on the first section and a second gripper is connected on the second section. The workpiece is simultaneously by both grippers.

In a number of additional embodiments, a robotic system for manipulating a workpiece includes an end effector having a fixture. A first arm is connected with the fixture and has a first section and a second section connected with the first section by a first joint assembly, with a first lock disposed in the first joint assembly. A second arm is connected with the fixture and has a third section and a fourth section connected with the third section by a second joint assembly, with a second lock disposed in the second joint assembly. A first gripper is included on the first arm and is configured to alternately grip and release the workpiece. A second gripper is included on the second arm and is configured to alternately grip and release the workpiece. A controller configured to: control the first lock to alternately lock and unlock the first joint assembly; control the second lock to alternately lock and unlock the second joint assembly; control the first gripper and the second gripper to hold the workpiece during a deformation of the workpiece; and unlock at least one of the first lock and the second lock to allow movement of the joint assembly to relieve forces on the at least one of the first arm and the second arm arising during a deformation of the workpiece.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
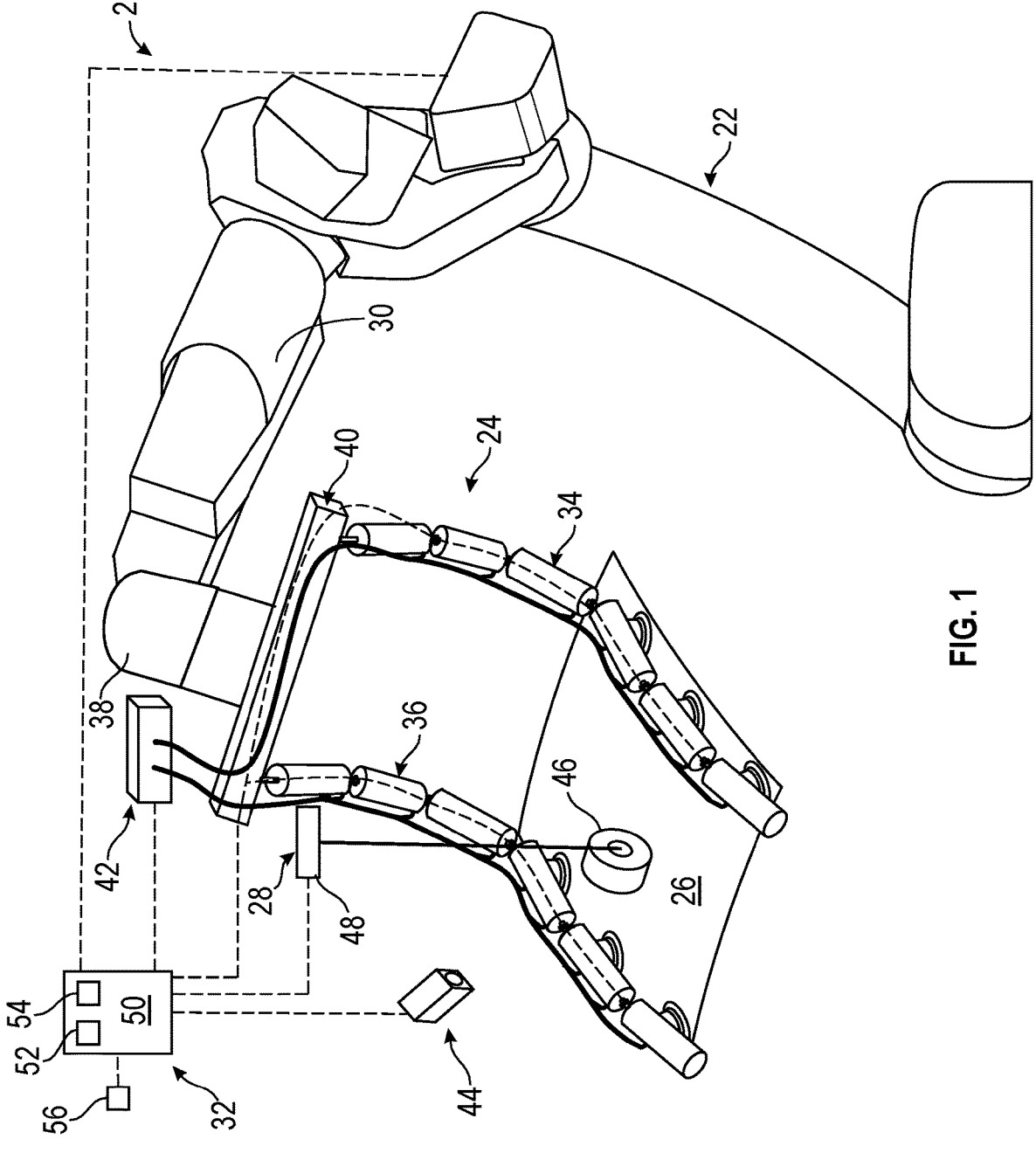
FIG. 1 is a schematic, perspective illustration of a robotic system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In a number of embodiments, a robotic system flexibly manipulates a workpiece and maintains a grip of the workpiece while geometric changes of the workpiece occur. The workpiece may be any product that is handled and for which geometric changes in the workpiece are made or are allowed to occur. For example, a workpiece may be gripped while forming operations are carried out in any manufacturing operation. In other examples, a workpiece may be gripped while stress is relieved, such as where the workpiece moves to its unconstrained state as springback occurs. Gripping a workpiece means holding the workpiece by the robotic systems end-of-arm tooling by any engagement mechanism as the gripper(s). While embodiments described herein may apply to certain manufacturing applications such as sheet forming, the current disclosure is not limited to any particular type of workpiece or manufacturing process, but is broadly applicable where the ability to manipulate a workpiece experiencing geometric changes is desirable.

As described herein, a robotic system may be used for automated craftsmanship, where robots hold the workpiece and the workpiece is deforming incrementally, such as when being worked by a manufacturing machine. The deformation would be constrained if the robotic grips on the part are rigid with no compliance. Instead, as disclosed herein, a robot end effector has arms with one or multiple rigid links with flexible joints that controllably alternate from a locked state with no movement to an unlocked state with free movement. Locking and unlocking of the flexible joints may be controlled automatically in groups of joints or of an individual joint. During the forming process, the joint locks are controlled to position the arms for firmly holding the workpiece when desired, while flexibly adapting to changing position and/or orientation of the gripped points on the sheet, as they remain gripped. The joints may be unlocked to relax and to avoid applying unwanted forces to the workpiece by the arms. For example, the lockable arms may be unlocked to allow quick spring-back of the workpiece without ungrasping the workpiece.

Referring to FIG. 1, illustrated is a robotic system 20 that in general, includes a robot 22, with an end effector 24, and a workpiece 26 being subjected to working by a manufacturing machine 28. The robot 22 may be autonomous, or may be a collaborative robot designed to work alongside humans in a manufacturing environment. In general, the robot 22 includes a number of linked together and moveable structural elements including a robot arm 30, and includes a control system 32 with a number of actuators and sensors for use when moving the robot arm 30 through three-dimensional space. In general, the end effector 24 includes a pair or arms 34, 36 connected with the end 38 of the robot arm 30 by a fixture 40. The end effector 24 is also coupled with the control system 32, and with a number of actuators and sensors for manipulating the workpiece 26. As illustrated, a three-dimensional vision system 44 is included for monitoring the workpiece 26, such as for scanning workpiece 26 curvature/deflection, which may be used in operating the end effector 24. The end effector 24 is also coupled with a pneumatic system 42 for operating the arms 34, 36. The pneumatic system 42 may also be coupled with the control system 32. While in the current embodiment the end effector 24 employs pneumatic actuators, in other embodiments, other types of actuator, such as electric actuators or other actuators may be used.

As illustrated, the manufacturing machine 28 application comprises forming a sheet that represents the workpiece 26, such as in creating a vehicle panel. The forming may be carried out by an English wheel 46 of a wheeling device 48. Wheeling has the advantage of being flexibly able to produce different panels using the same wheeling device 48 with a wheel 46 of different geometries in a forming process that works the surface of the workpiece 26 to cause plastic deformation. Wheeling may be efficiently used where low volumes of compound curved panels are produced in relatively low volumes. The robotic system 20 is applicable to other types of manufacturing operations such as bending, shearing, drawing, stretching, piercing, and others.

The control system 32 includes a controller 50, which may include a processor 52, a memory device 54, and may include or be coupled with a storage device 56. While one controller 50 is shown coupled with the robot 22, with the end effector 24, with the pneumatic system 42, with the vision system 44 and with the manufacturing machine 28, any number of controllers may be used operating in coordination to carry out the various functions. Accordingly, while the components of the control system 32 are depicted as being part of the same system, it will be appreciated that in certain embodiments, these features may comprise multiple systems and any number of individual controllers may be employed. The controller 50 may carry out instructions, when executed by the processor 52, support the receipt and processing of signals such as from the various sensors, and the performance of logic, calculations, methods and/or algorithms for automatically controlling the components and systems described herein, such as various actuators of the robotic system 20. During operation, the processor 52 may execute one or more programs and may use data, each of which may be accessed from the storage device 56 and as such, the processor 52 controls the general operation of the controller 50 in executing the processes described herein, such as the processes described further below in connection with FIG. 9. The memory device 54 may store the above-referenced programs along with one or more stored values of the data such as for short-term data access. The storage device 56 stores data, such as for long-term data access for use in automatically controlling the robotic system 20

Figures 2, 3:
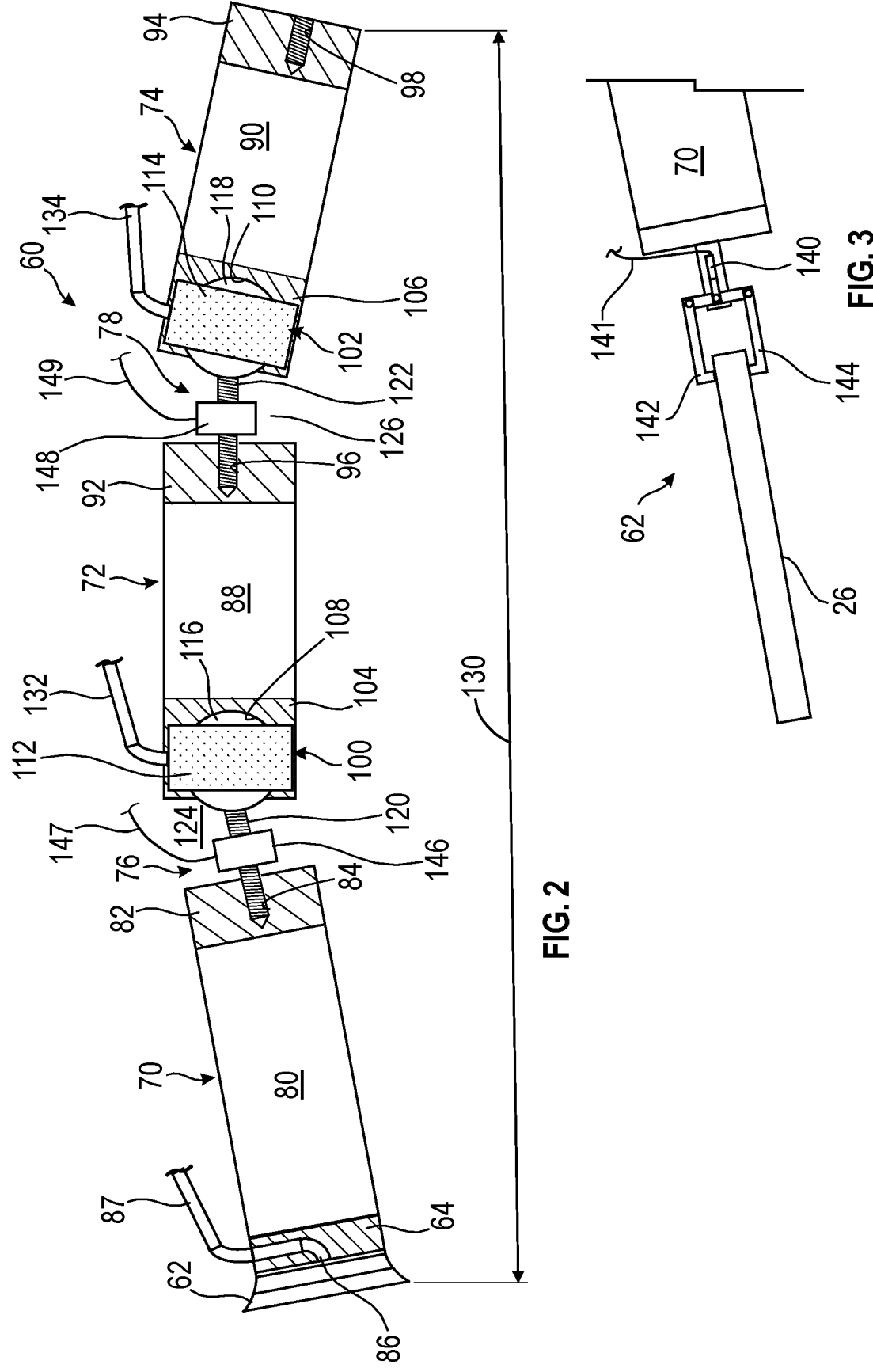
FIG. 2 is a schematic view of a part of the compliant tooling of the robotic system of FIG. 1 with a pneumatic end gripper, in accordance with various embodiments.
FIG. 3 is a schematic view of a part of the compliant tooling of the robotic system of FIG. 1 with a mechanical gripper, in accordance with various embodiments.

Referring to FIG. 2, an embodiment of an arm segment 60 useable as or in one of the arms 34, 36 of FIG. 1, is illustrated with a gripper 62 at the distal end 64 of the arm segment 60. The distal end 64 is the end of the arm 34, 36 furthest from the fixture 40. The arm segment 60 includes three arm sections 70, 72, 74 connected by two joints 76, 78. As such, the arm sections 70, 72, 74 may be described as comprising rigid links of the arm 34, 36 linked together at the articulatable joints 76, 78. In embodiments, the arms 34, 36 may be made of any number of plural sections as determined by the reach and flexibility needed of the arms 34, 36 for the application. The arm section 70 includes a rigid body 80, which in the current embodiment is cylindrical and tubular, with an internal, solid, connection insert 82 for coupling with the arm section 72. The connection insert 82 comprises a disc-like insert with a threaded bore 84 at its end facing the arm section 72. The arm section 70 also includes the gripper 62, which in this embodiment is a suction cup. A coupling 86 is disposed inside the body 80 for coupling the suction cup/gripper 62 with an external pneumatic line 87, which may be configured to extend to the pneumatic system 42 of FIG. 1. Accordingly, the arm segment 60 is configured to grip the workpiece 26 by suction/vacuum and is able to release the workpiece 26 when the application of vacuum is stopped.

The arm sections 72, 74 are substantially identical and include respective bodies 88, 90, which are rigid and tubular, respective connection inserts 92, 94, which are internal, solid and have threaded bores 96, 98, and which include respective joint assemblies 100, 102. The joint assemblies 100, 102 include sockets 104, 106, which are configured as solid, disk-like inserts with openings 108, 110 that are semi-spherical shaped and that contain respective locking bands 112, 114, which in the current view are exposed but not sectioned. The openings 108, 110 captively contain respective balls 116, 118 disposed within the locking bands 112, 114. The balls 116, 118 are rigidly connected with respective shafts 120, 122. The shaft 120 is threaded into the bore 84 connecting the arm section 70 with the arm section 72 with a space 124 between the bodies 80, 88 so that they may pivot relative to each other at various angles and in various directions to allow joint assembly 100, 102 movement with multiple degrees of freedom. Similarly, the shaft 122 is threaded into the threaded bore 96 connecting the arm section 74 with the arm section 72 with a space 126 between the bodies 88, 90 so that they may pivot relative to each other. As viewed, the joints 76, 78 are bent to some extent and the arm segment 60 has a length 130. Imparting a greater amount of bend to one or both of the joints 76, 78 shortens the length 130, and imparting a smaller amount of bend to one or both of the joints 76, 78 increases the length 130. Through this mechanism, the arm segment 60, and therefore the arms 34, 36, are able to compensate for movement of their gripping points on the workpiece 26 when their joints 76, 78 are unlocked.

Enabling compensation of the gripping points to be achieved while the gripper 62 continues to hold the workpiece 26 is accomplished by a selective locking and unlocking of the joints 76, 78. In the current embodiment, the joint assembly 100 includes the locking band 112, may be configured as an expandable bladder-like structure coupled with the pneumatic system 42 through a pneumatic line 132. The locking band 112 locks the joint 76 by a selective squeezing force on the ball 116, which when applied due to the application of pneumatic pressure, locks and prevents movement of the ball 116 in the socket 104 and prevents bending of the joint 76. When the force/pneumatic pressure is relieved, the joint 76 is allowed to freely bend by overcoming only a very small amount of frictional force of the ball 116 in the socket 104, so that the ball 116 pivots. In other embodiments, the locking band 112 may be configured with a lever mechanism (not shown) that may use pneumatic pressure and/or vacuum for operation, where pivoting of the lever mechanism alternatively squeezes and releases the force on the ball 116 by respectively decreasing or increasing the diameter of the locking band 112. In other embodiments another type of locking mechanism may be employed. For example an electrically driven actuator (not shown) may be used, such as with a motor and gearset, to selectively increase and decrease the diameter of the locking band 112. In embodiments, the pressure/force applied to the ball 116 by the pneumatic system 42/other mechanism may be varied to allow the joint 76 to bend under a tailorable amount of force.

Similarly, the joint assembly 102 includes the locking band 114, which may be configured as an expandable bladder-like structure, or as a lever driven friction band structure, coupled with the pneumatic system 42 through a pneumatic line 134. The locking band 114 locks the joint 78 by a selective squeezing force on the ball 118, which when applied due to the application of pneumatic pressure variation prevents movement of the ball 118 in the socket 106 and prevents bending of the joint 78. When the force is relieved, the joint 78 is allowed to freely bend by overcoming only a very small amount of frictional force of the ball 118 in the socket 106 so that the ball 118 pivots/rotates therein. In other embodiments, the locking band 114 may be configured with a lever mechanism (not shown) that may use pneumatic pressure and/or vacuum for operation, where pivoting of the lever mechanism alternatively squeezes and releases the force on the ball 118 by respectively decreasing or increasing the diameter of the locking band 114. In other embodiments another type of locking mechanism may be employed. For example an electrically driven actuator (not shown) may be used, such as with a motor and gearset, to selectively increase and decrease the diameter of the locking band 114. In embodiments, the pressure/force applied to the ball 118 by the pneumatic system 42/other mechanism may be varied to allow the joint 78 to bend under a tailorable amount of force. In other embodiments, another type of joints 76, 78 may be employed. For example, any lockable, articulating joint such as translating/sliding joints, orthogonal joints, rotational joints, twisting joints, revolving joints, or a combination thereof may be used.

Control of the joints 76, 78 may be accomplished according to preprogrammed algorithms and/or may be accomplished with the assistance of real-time inputs. For example, in this embodiment, the joints 76, 78 include force sensors configured as load cells 146, 148. The load cells 146, 148 are disposed on the shafts 120, 122, respectively. The shafts 120, 122 may be minimally elastic and the load cells 146, 148 may be constructed to sense the stress/forces in the shafts 120, 122, such as through a strain gauge configuration. Accordingly, when the workpiece 26 applies a load to the arms 34, 36, the load cells 146, 148 provide signals to the controller 50, such as through the conductors 147, 149 respectively, indicative of the load. Knowing the load at each joint 76, 78, etc., enables individual control of the joints 76, 78, etc. to make knowledgeable determinations about at which joints 76, 78, etc. to vary the state of being locked. For example, one or more joints may be unlocked, or one or more joints may be unlocked to varying degrees to control the bending of the joints 76, 78, etc. for the specific, current state of the workpiece 26 and the existing forces.

Referring to FIG. 3, an alternative embodiment for the gripper 62 is illustrated. In this case, the gripper 62 is configured as a robotic hand-like clamp that may be selectively opened and closed (as shown), to hold or release the workpiece 26. The gripper 62 may include an electrically operated actuator 140 coupled with the controller 50 via a conductor 141. The controller may operate to effect movement of the jaws 142, 144 through the actuator 140 and any number of pivotable links. In other embodiments, any number of jaws may be used. In other embodiments, other forms of grippers may be used, such as electromagnets, expanding mandrels, threaded shafts, articulated fingers, or others.

Figure 4:
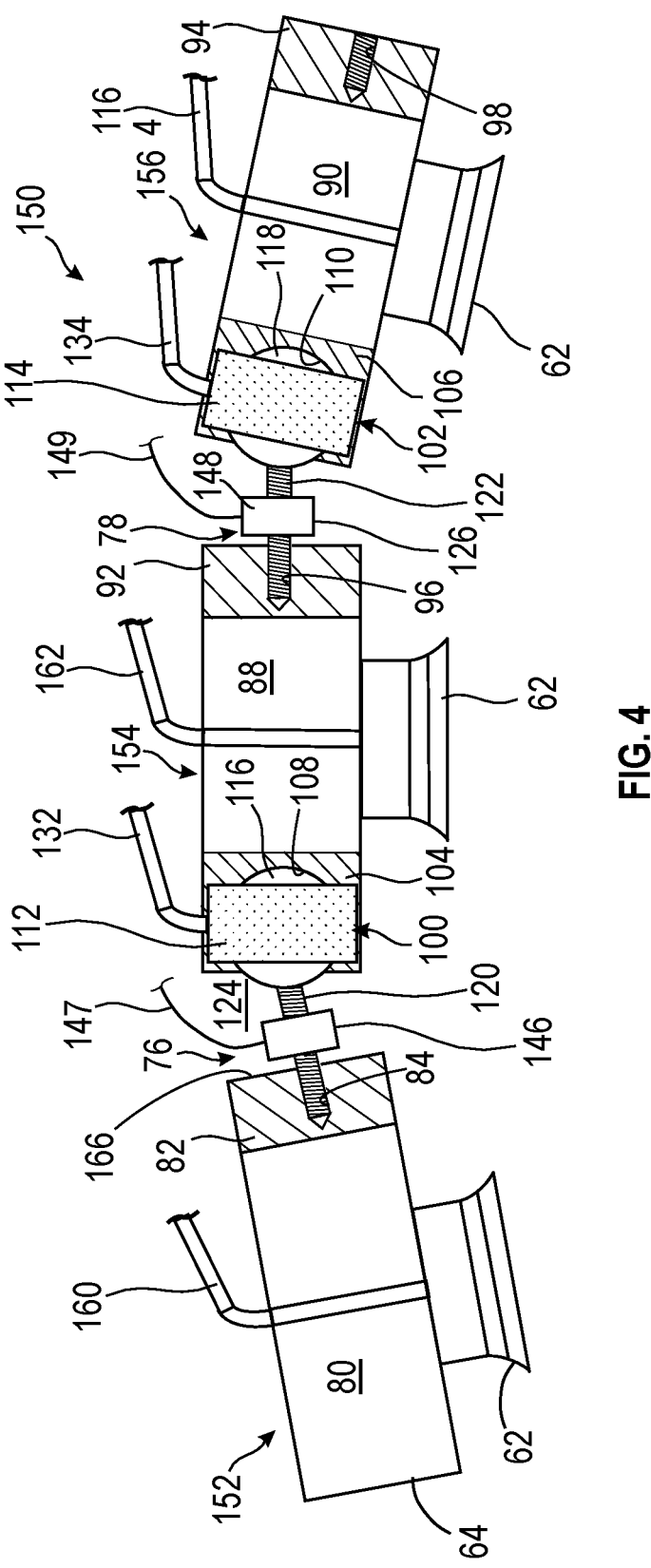
FIG. 4 a schematic view of a part of the compliant tooling of the robotic system of FIG. 1 with a plurality of pneumatic side grippers, in accordance with various embodiments.

An embodiment of another arm segment 150 is illustrated in FIG. 4 with a plural number of grippers 62. In this embodiment, each of the joint sections 152, 154, 156 includes a gripper 62, and the embodiment corresponds to the end effector 24 of FIG. 1. Each of the grippers 62 is configured as a suction cup and is coupled with the pneumatic system 42 through a respective conduit 160, 162, 164. The conduits 160, 162, 164 extend through their respective body 80, 88, 90 to their respective gripper 62. The gripper 62 on the body 80, for example, is disposed on the side 168 of the tubular body 80 between the distal end 64 and the end 166 containing the connection insert 82. The grippers 62 on the bodies 88, 90 are similarly disposed so that the arm segment 150 may engage the workpiece 26 at three places, which effectively adapts to gripping larger and/or heavier workpieces 26.

Figure 5:
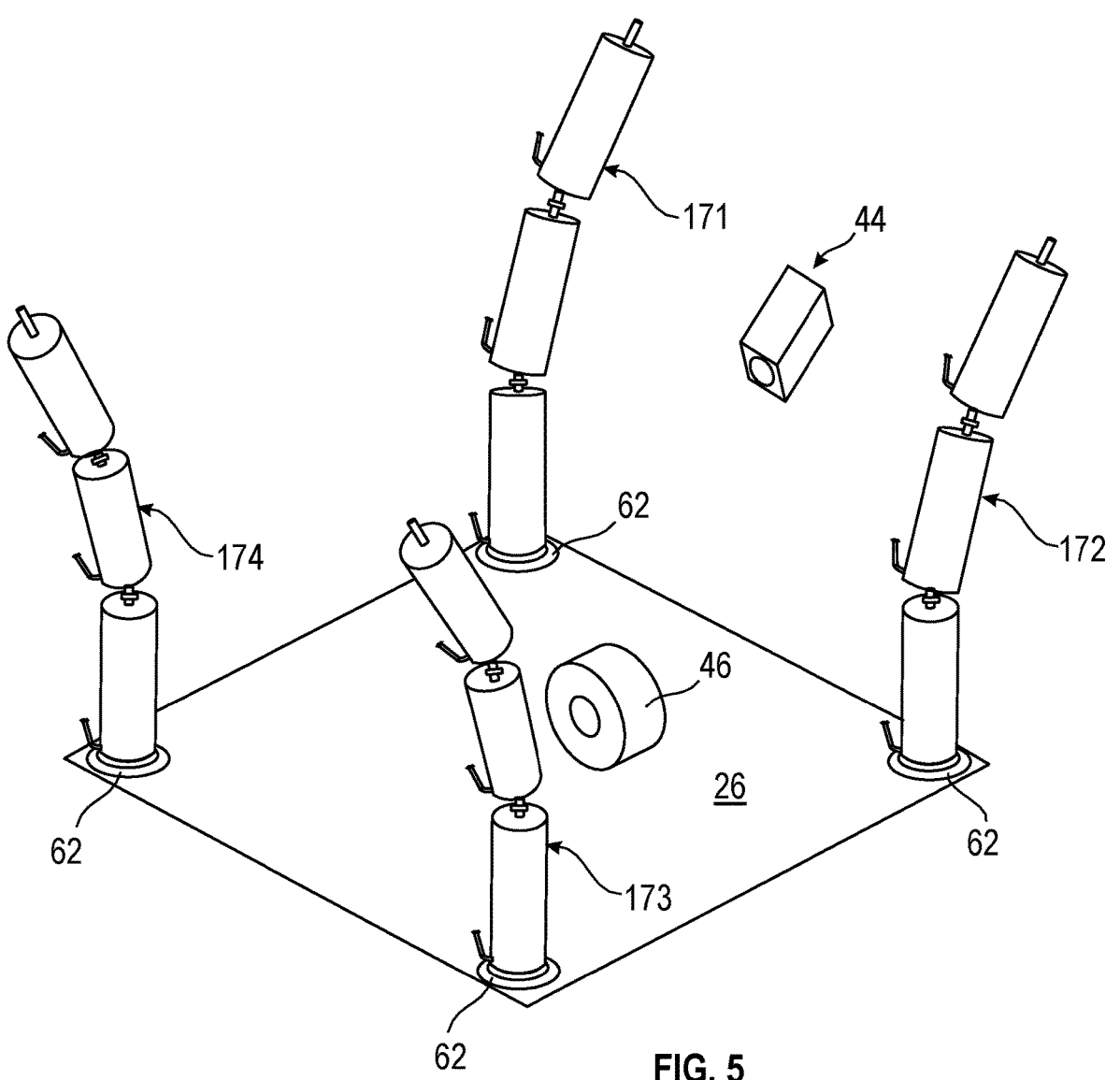
FIG. 5 is a schematic view of a part of the compliant tooling useable with the robotic system of FIG. 1, gripping a sheet as it is being formed, in accordance with various embodiments.

A step in processing the workpiece 26 is illustrated in FIG. 5, to which reference is directed. Four arms 171-174 are included with grippers 62 at each of their distal ends. As such, the arms 171-174 are each configured with the arm segment 60 of FIG. 2. It should be understood that each of the arms 171-174 may be connected with a common structure, such as the fixture 40, for coupling with the robot 22. The workpiece 26 may initially be disposed in a planer, flat state as illustrated in FIG. 5, and the arms 171-174 may have their respective joints locked. In this configuration, the workpiece 26 may be engaged from a presentation location, such as from a stack of blanks, gripped with the joints unlocked to find a stress-free coupling with the workpiece 26, and then locked for rigidity and transported by the robot 22 to a forming operation, such as for working via the English wheel 46.

Figure 6:
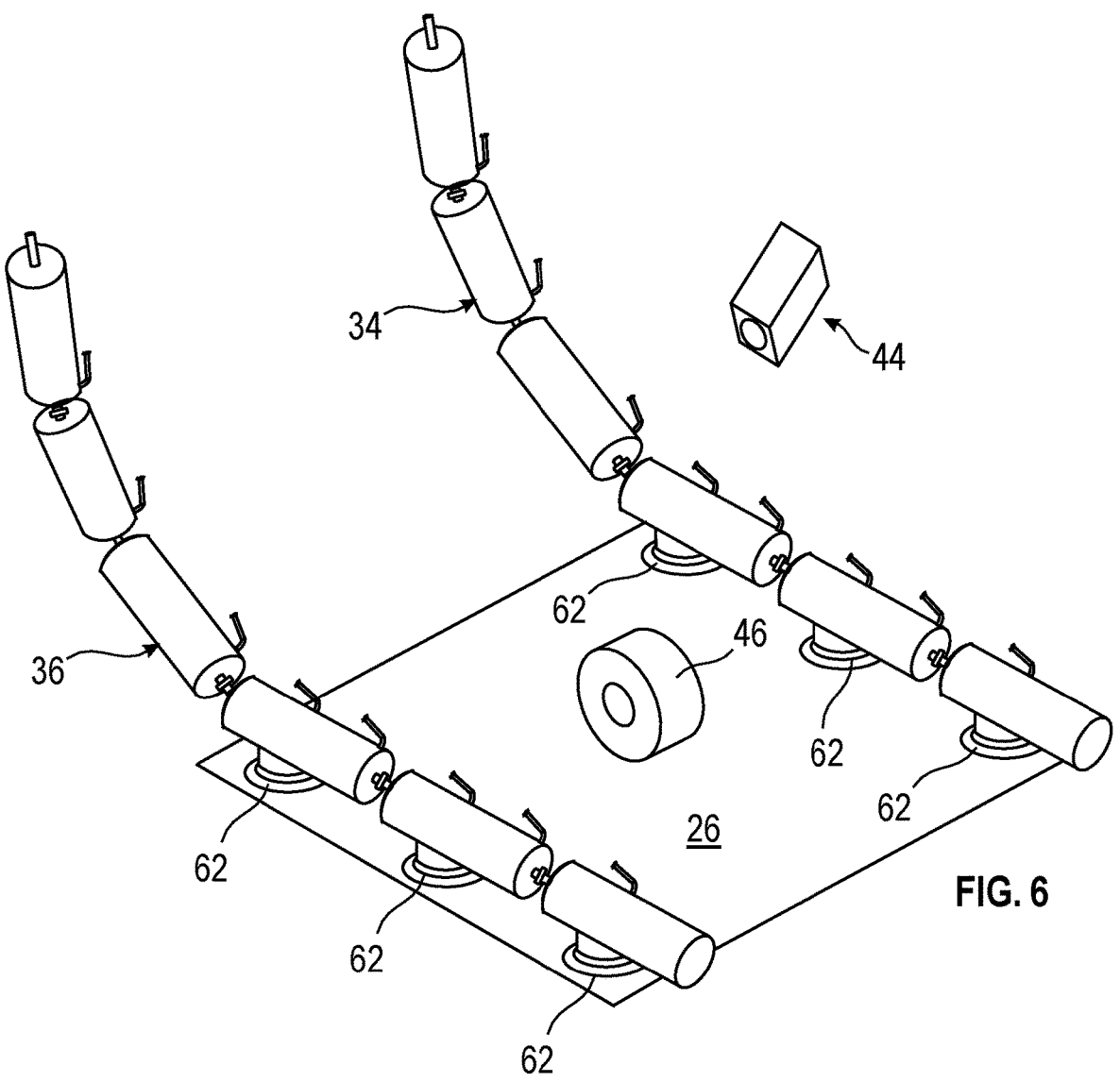
FIG. 6 is a schematic view of a part of the compliant tooling of the robotic system of FIG. 1 gripping and locating a sheet in preparation for forming, in accordance with various embodiments.

An engagement step in processing the workpiece 26, similar to that of FIG. 5, is illustrated in FIG. 6, to which reference is directed. The two arms 34, 36 are included with grippers 62 at each of three arm sections per arm 34, 36. As such, the arms 34, 36 are each configured with the arm segment 150 of FIG. 4. Each of the arms 34, 36 may be connected with a common structure, such as the fixture 40, for coupling with the robot 22 as shown in FIG. 1. The workpiece 26 may initially be in a planer, flat configuration as illustrated in FIG. 6 and the arms 34, 36 may have their respective joints unlocked for engagement and then locked. In this configuration, the workpiece 26 may be engaged, such as from a stack of blanks, gripped, and transported by the robot 22 to a forming operation, such as for working via the English wheel 46.

Figure 7:
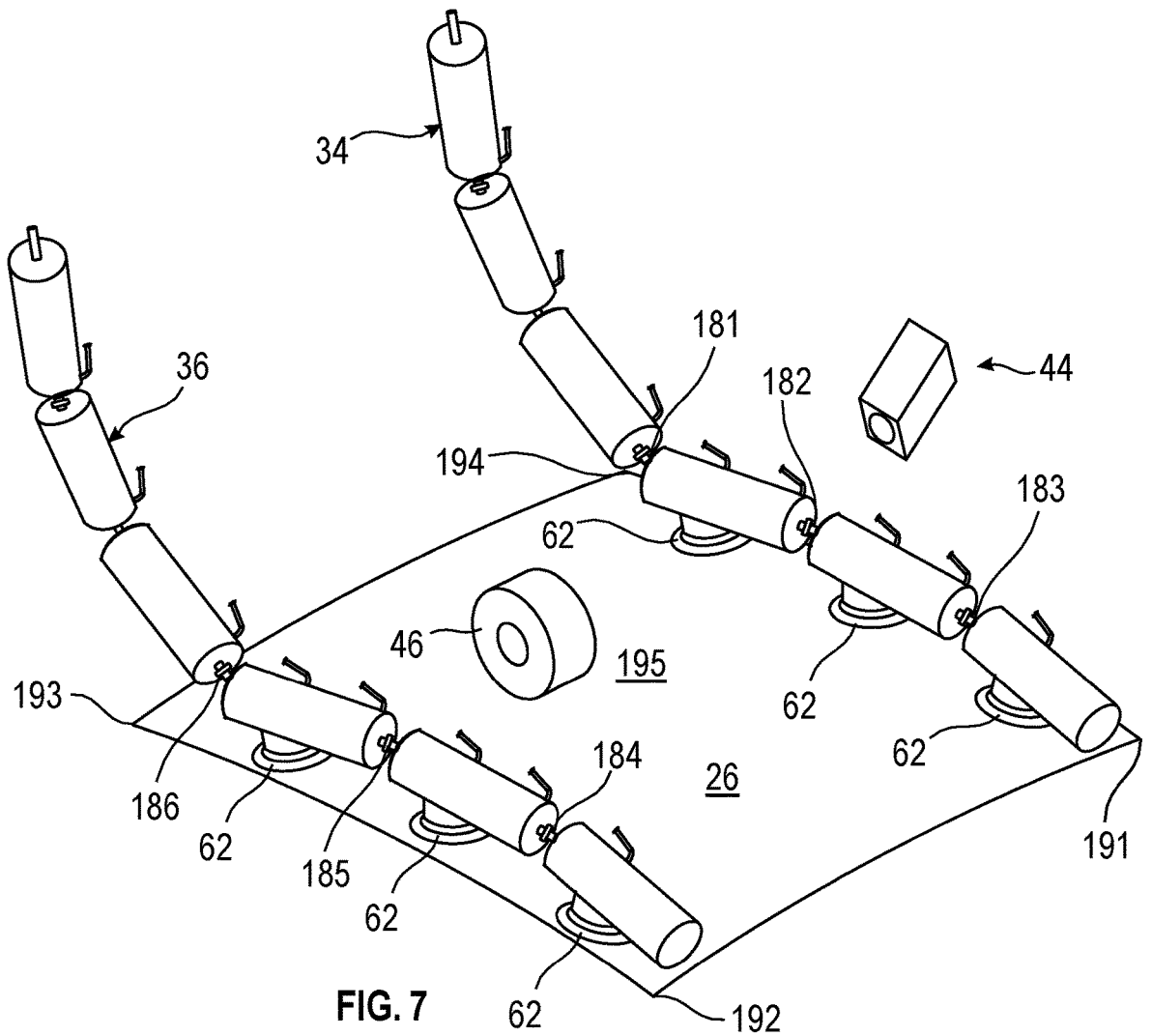
FIG. 7 is a schematic view of a part of the compliant tooling of the robotic system of FIG. 1 gripping a sheet as it is being formed, in accordance with various embodiments.

Referring to FIG. 7, the workpiece 26 has been at least partially worked by the English wheel 46 and a deformation has been imparted to the workpiece 26 as compared to the configuration of FIG. 6. For example, the corners 191-194 of the workpiece 26 have been moved downward, as viewed, relative to the center 195 of the workpiece 26. As a result, the grippers 62 are moved downward to continue holding the workpiece 26. During the working where the geometric characteristics of the workpiece 26 are changed, any number of the joints, such as the joints 181-186 may be unlocked to allow all six of the grippers 62 to maintain a hold on the workpiece 26 during the deformation. After working is complete, or as an interim step, the any or all of the joints 181-186 may be relocked.

Figure 8:
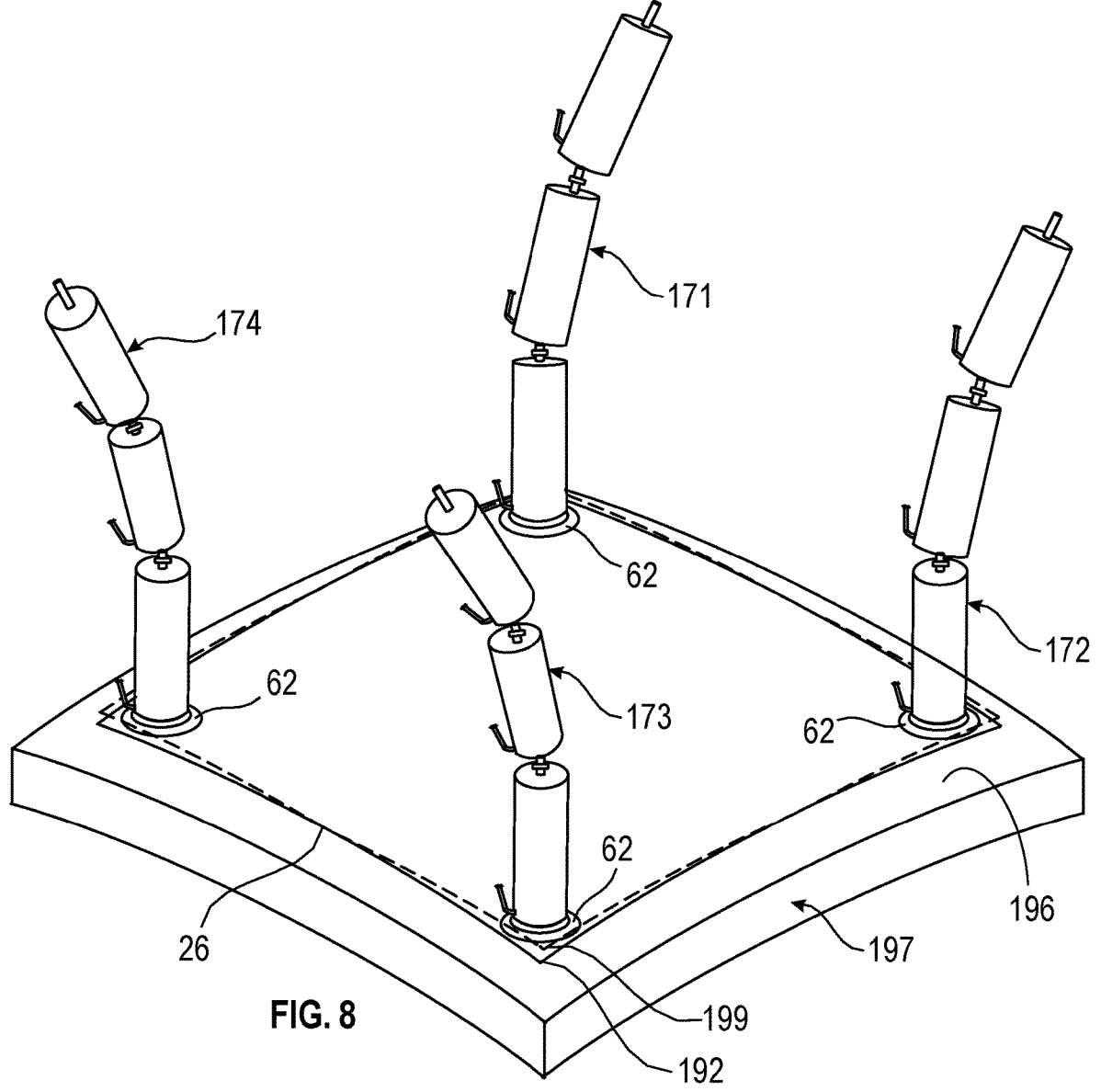
FIG. 8 is a schematic view of a part of the compliant tooling useable with the robotic system of FIG. 1, gripping a sheet while allowing stress relief, in accordance with various embodiments.

As illustrated in FIG. 8, the workpiece 26 may be worked on the surface 196 of a supporting fixture 197. Any or all of the joints of the arms 171-174 may be unlocked to allow the workpiece 26 to allow stress relief. For example, spring-back may be allowed in the workpiece 26 as the unlocked joints of the arms 171-174 bend to a greater extent. For example, the corner 192 may move upward to a position 199 as a result of spring-back when the joints are unlocked.

Figure 9:
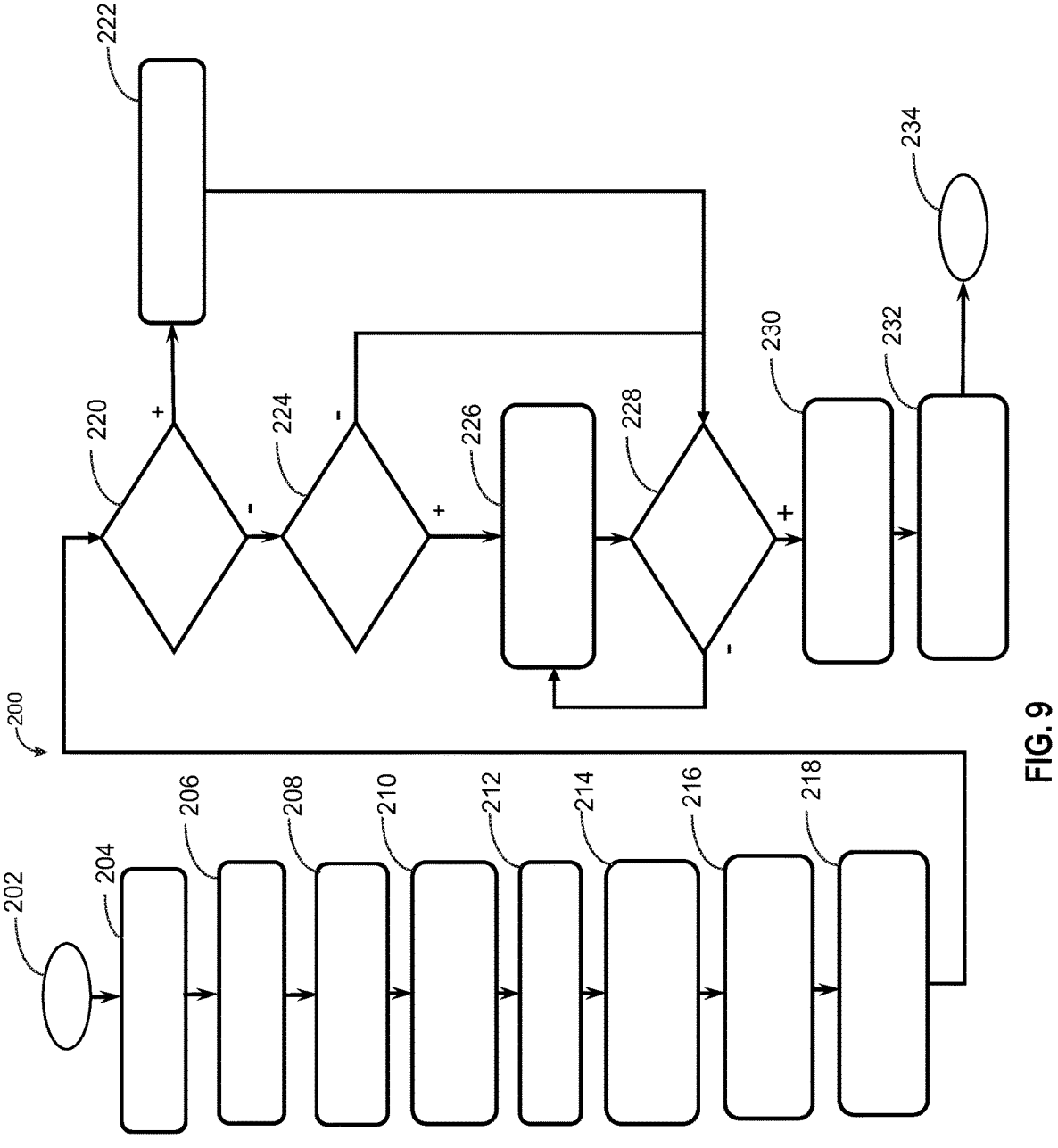
FIG. 9 is a flow chart of a process for using the robotic system of FIG. 1, in accordance with various embodiments.

A process 200 for the use of the robotic system 20 is illustrated in flowchart form in FIG. 9, to which reference is directed, along with FIGS. 1-8. The process 200 starts 202 and the workpiece 26 is presented 204 for access by the robot 22. For example, the workpiece 26 may be placed on a fixture that orients it in a desired position. In some embodiments, the workpiece 26 may be presented in a stack of similar workpieces from which one is removed at a time. The end effector 24 is moved 206, such as under control of the control system 32, to the presented 204 workpiece 26 and the grippers 62 are engaged with the workpiece 26. The arms 34, 36 are relaxed with the joints unlocked before, during, or after engagement with the workpiece 26 so that the arms, such as the arms 34, 36, may make stress free couplings with the workpiece 26. In some embodiments, the joints of an arm 34, 36 may be unlocked progressively, such as during engagement with the workpiece 26. Following complete engagement, the grippers 62 are actuated, such as by the controller to grip 212 the workpiece 26. Following gripping 212 in a relaxed state the joints, with the arms 34, 36 bent, all joints are locked 210, such as by the controller 50.

As the process 200 continues, the workpiece 26 is gripped 212 and held by the robot 22 via the end effector 24. The arms 34, 36 are inflexible/rigid, with all of their joints locked. The robot 22 is operated, such as by the control system 32 via the controller to move 214 the workpiece 26 to a position for working by the manufacturing machine 28. In embodiments, the workpiece 26 is placed on the surface 196 of the supporting fixture 197, with the grippers 62 continuing to hold the workpiece 26. Force sensors in the arms 34, 36, such as the loads cells 146, 148, provide signals to the controller 50 and the stress-free baseline forces on each arm 34, 36 at each of their joints is recorded 216, such as in the storage device 56 of/coupled with the controller 50. Force sensors, such as the load cells 146, 148 may be located at each joint of each arm, such as the arms 34, 36. In addition, nor as an alternative, the vision system 44, as operated by the controller 50, may scan the workpiece 26 to records 216 data of the three-dimensional coordinates of the surface of the workpiece 26, including its curvature.

The process 200 continues with initiation of working 218 of the workpiece 26, such as by forming via the manufacturing machine 28, such as imparting plastic deformation via the English wheel 46. During the working 218, the grippers 62 continue to hold the workpiece 26. Also during the working 218, the controller 50, such as through the load cells 146, 148, monitors and measures forces at each joint of the arms 34, 36 and/or the controller 50, such as via the vision system 44, monitors deformation/curvature of the workpiece 26. A determination 220 is made, such as by the processor 52 of the controller as to whether the measured forces on the arms 34, 36 exceed the recorded baseline values by a force threshold (the amount force has increased from the baseline force). The force threshold may be determined for each specific application such as by computer based modelling and/or testing. For example, a force threshold may be set at a level above the baseline force that, when the measured forces are maintained below, prevents movement or disconnection of the grippers 62 relative to the workpiece 26. In another example, the force threshold may be set, at least for certain stages, at a level that prevents spring-back of the workpiece 26. The force threshold may be set as a delta force value over the baseline force, where the measured force is compared to the baseline force and when the difference exceeds the delta force value, the determination 220 is positive. When the determination 220 is positive, meaning a measured force exceeds the force threshold, the process continues with unlocking 222 one or more joints. When the measured force exceeds the force threshold in one of the arms 34, 36, that one arm (arm 34 or arm 36) is unlocked during ongoing working 218 of the workpiece 26 to release the force in that arm by allowing its joint(s) to move. If the measured force exceeds the force threshold in a plural number of arms 34, 36, the working 218 is paused while the plural arms (e.g. arm 34 and arm 36) are unlocked 222 to relieve the force by allowing the joints to move with the grippers 62 continuing to hold the workpiece 26. Once the arm(s) 34, 36 are relaxed, their joints are relocked for more working 218.

In addition to use of the force information, or in place of using the force information, the controller 50, such as via the vision system 44, monitors ongoing deformation/curvature of the workpiece 26 during the working 218. When the determination 220 is negative, meaning a measured force does not exceed the force threshold, or in place of the determination 220, the process continues to determine 224, such as by the controller 50, as to whether the monitored deformation via the vision system 44, exceeds the baseline stored data values by a deformation threshold amount. When the monitored deformation exceeds the deformation threshold in the workpiece 26, the process 200 proceeds to unlock 226 the arms 34, 36 by unlocking their joints to relax the arms 34, 36. Once the arms 34, 36 are relaxed, which occurs after the joints move, the joints are relocked for further working 218.

When the determination 224 is negative, meaning the monitored deflection does not exceed the deformation threshold, and/or when proceeding from the unlock 222 step, the process 200 proceeds to determine 228 whether either of the measured forces or the monitored deflection exceeds its respective threshold. When the determination is negative, meaning the values are both below their threshold, the process 200 proceeds to continue working 230. When either or both of the values exceeds its threshold, the process returns to unlock 226 and proceeds to continue working 230 only when both values are below their respective threshold. In embodiments, the controller 50 may be programmed to automatically move to unlock 222 and to perform a complete relaxation of all arms (such as the arms 34, 36), at defined intervals, such as at specific bended states, to relieve stresses. After relaxation at unlock 226, the joints are all locked and the process 200 proceeds. When the manufacturing machine 28 has completed its operation on the workpiece 26, the robot 22 is operated, such as by the controller 50, to move 232 the workpiece 26 to its completed destination and the grippers 62 are operated to release the workpiece 26 and the process 200 ends 234. The steps of the process 200 may be completed in any order including in different orders than described above. In addition, only some of the steps in the process 200 may be completed, with some being omitted.

In summary, the end effector 24 includes one or multiple lockable arms 34, 36, etc. which controllably alternate from being rigid to being flexible as needed. The arms 34, 36, etc. include links/sections connected by joints which may be placed in a locked state with no movement, in an unlocked state to allow joint movement with multiple degrees of freedom, or in a smart state to allow movement under application of a threshold force. Locking/unlocking of each joint or all joints in one arm or in multiple arms is controlled automatically, such as by controller 50. Unlocking, relaxation and relocking of the arms 34, 36, etc. in-turn during forming may be programmed to achieve incremental spring-back compensation, while the workpiece remains being held by the grippers 62. Force sensors, such as load cells 146, 148 may be used to monitor the forces (tension/compression/bending/shear) on the arms 34, 36, etc. When increased forces are sensed compared to the baselines, an unlocking sequence may be initiated consecutively on each joint until the forces drop to the baseline level. Curvature/deflection of the workpiece 26 may be used as unlocking guidance. When the curvature's change exceeds a specified threshold, forming may be ceased and a complete relaxation may be undertaken by unlocking and re-locking all arms 34, 36, etc.

Through the foregoing embodiments, automatic robotic systems and methods are provided for gripping a workpiece during manufacturing operations with arms that have lockable compliance. A robot end effector has arms consisting of one or multiple rigid links with flexible joints which can alternate from locked state with no movement to unlocked state with free rotation. The locking and unlocking of the joints may be controlled automatically in groups or individually. During the forming process, the joints locks are controlled to have the arms in position for firmly holding the workpiece while flexibly adapting to the changing position/orientation of the gripping points on the sheet. The joints may be unlocked to relax and relieve contained forces. The lockable arms may operate to allow quick spring-back of the workpiece without ungrasping the workpiece.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A robotic system for manipulating a workpiece, the robotic system comprising:
    an arm having a first section and a second section connected with the first section by a joint assembly, with a lock disposed in the joint assembly;
    a first gripper connected on the arm at the first section and configured to alternately grip and release the workpiece;
    a second gripper disposed on the second section, the first gripper and the second gripper configured to simultaneously grip the workpiece; and
    a controller configured to operate the lock to alternately lock and unlock the joint assembly,
    wherein the first and second grippers are configured to hold the workpiece during a deformation of the workpiece, with the controller being configured to unlock the lock to allow movement of the joint assembly to relieve forces on the arm arising during a deformation of the workpiece.

2. The robotic system of claim 1, wherein the joint assembly includes a force sensor configured to provide a force signal to the controller, wherein the controller is configured to unlock the joint assembly when the force signal exceeds a threshold force.

3. The robotic system of claim 1, wherein the controller is configured to unlock the lock while the first and second grippers hold the workpiece.

4. The robotic system of claim 1, comprising a vision system configured to provide a signal to the controller indicative of deformation of the workpiece, wherein the controller is configured to unlock the joint assembly when the signal indicates exceeding a threshold deformation.

5. The robotic system of claim 1, wherein the first section comprises an elongated body with a first end, a second end, and a side extending from the first end to the second end, wherein the first end is connected with the joint assembly, wherein the second end is connected with the second section, wherein the first gripper is connected at the side of the elongated body.

6. The robotic system of claim 1, wherein:
    the arm is a first arm and comprising a second arm that includes a second lock configured to alternately lock and unlock the second arm, and includes a plurality of grippers configured to alternately grip and release the workpiece,
    wherein the controller is configured to alternately lock and unlock the second lock.

7. The robotic system of claim 1, wherein the joint assembly includes a force sensor configured to provide a force signal to the controller, wherein the controller is configured to:
    record a baseline force on the arm, the baseline force recorded based on the force signal received prior to the deformation of the workpiece;

receive a measured force from the force sensor after initiation of the deformation;

compare the measured force to a threshold force; and unlock the joint assembly when the measured force exceeds the threshold force.

8. The robotic system of claim 1, wherein the first gripper comprises a suction cup and comprising a pneumatic system coupled with the suction cup and with the controller, the controller configured to control the pneumatic system to maintain connection between the suction cup and the workpiece during the deformation.

9. The robotic system of claim 1, wherein the joint assembly includes a ball and socket joint, wherein the lock includes a band encircling the ball and configured, in response to the controller, to squeeze the ball to lock the joint.

10. The robotic system of claim 1, wherein the first and second sections are part of a series of sections connected by a series of joints so that the arm is reconfigurable into a variety of bent shapes, in each of which the arm is lockable.

11. A method for manipulating a workpiece, the method comprising:

constructing an arm to have a first section and a second section connected with the first section by a joint assembly, with a lock disposed in the joint assembly;

connecting a first gripper with the first section of the arm;

connecting a second gripper on the second section;

gripping the workpiece simultaneously by the first gripper and the second gripper;

releasing the workpiece from the first and second grippers;

operating, by a controller, the lock to alternately lock and unlock the joint assembly, holding, by the first and second grippers, the workpiece during a deformation of the workpiece, with unlocking, by the controller, the lock to allow movement of the joint assembly; and relieving, by the unlocking, forces on the arm arising during a deformation of the workpiece.

12. The method of claim 11, comprising:

positioning a force sensor at the joint assembly;

providing, by the force sensor, a force signal to the controller; and unlocking, by the controller, the joint assembly when the force signal exceeds a threshold force.

13. The method of claim 11, comprising, unlocking, by the controller, the lock while the first and second grippers hold the workpiece.

14. The method of claim 11, comprising:

providing, by a vision system configured to provide a signal to the controller indicative of deformation of the workpiece; and unlocking, by the controller, the joint assembly when the signal exceeds a threshold deformation.

15. The method of claim 11, comprising:

forming the first section with an elongated body having a first end, a second end, and a side extending from the first end to the second end;

connecting the first end with the joint assembly;

connecting the second end with the second section; and connecting the first gripper at the side of the elongated body.

16. The method of claim 11, comprising:

adding a second arm that includes a second lock configured to alternately lock and unlock the second arm, and a plurality of grippers configured to alternately grip and release the workpiece; and alternately locking and unlocking, by the controller, the second lock.

17. The method of claim 11, comprising:

positioning a force sensor at the joint assembly;

providing, by the force sensor, a force signal to the controller;

recording, by the controller and prior to the deformation of the workpiece, a baseline force on the arm as received from the force sensor;

receiving, by the controller and from the force sensor, a measured force after initiation of the deformation;

comparing, by the controller, the measured force to a threshold force;

unlocking, by the controller, the joint assembly when the measured force exceeds the threshold force.

18. The method of claim 11, comprising:

constructing the first gripper as a suction cup;

coupling a pneumatic system with the suction cup and with the controller; and controlling, by the controller the pneumatic system to maintain connection between the suction cup and the workpiece during the deformation.

19. The method of claim 11, comprising:

constructing the first and second sections as a part of a series of sections connecting the series of sections by a series of joints;

reconfiguring, by the series of sections and the series of joints, the arm into a variety of bent shapes; and locking the arm in each of the bent shapes.

20. A robotic system for manipulating a workpiece, the robotic system comprising:

an end effector having a fixture;

a first arm connected with the fixture, the first arm having a first section and a second section connected with the first section by a first joint assembly, with a first lock disposed in the first joint assembly;

a second arm connected with the fixture, the second arm having a third section and a fourth section connected with the third section by a second joint assembly, with a second lock disposed in the second joint assembly;

a first gripper on the first section and a second gripper on the second section of the first arm, the first and second grippers configured to alternately grip and release the workpiece, simultaneously;

a third gripper on the third section and a fourth gripper on the fourth section of the second arm, the third and fourth grippers configured to alternately grip and release the workpiece; and a controller configured to:

control the first lock to alternately lock and unlock the first joint assembly;

control the second lock to alternately lock and unlock the second joint assembly;

control the first gripper and the second gripper to hold the workpiece during a deformation of the workpiece; and unlock at least one of the first lock and the second lock to allow movement of at least one of the first joint assembly and the second joint assembly to relieve forces on the at least one of the first arm and the second arm arising during a deformation of the workpiece.

* * * * *